United States Patent
Janmey

(10) Patent No.: US 6,312,850 B1
(45) Date of Patent: Nov. 6, 2001

(54) CURRENT COLLECTOR AND SEAL ASSEMBLY FOR ELECTROCHEMICAL CELL

(75) Inventor: Robert M. Janmey, Olmsted Township, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/395,696

(22) Filed: Sep. 14, 1999

(51) Int. Cl.$^7$ .................................................. H01M 2/06
(52) U.S. Cl. ............................ 429/174; 429/171; 429/185
(58) Field of Search .................................. 429/174, 169, 429/171, 185

(56) References Cited

U.S. PATENT DOCUMENTS

| | | | |
|---|---|---|---|
| 3,740,271 | 6/1973 | Jammet et al. | 136/107 |
| 5,422,201 | 6/1995 | Georgopoulos | 429/170 |
| 5,667,912 | 9/1997 | Georgopoulos | 429/170 |
| 5,776,631 | 7/1998 | Wu | 429/171 |
| 5,932,371 | 8/1999 | Tucholski | 429/185 |

FOREIGN PATENT DOCUMENTS

WO 00/35031   6/2000  (WO) ............................. H01M/2/00

*Primary Examiner*—John S. Maples
(74) *Attorney, Agent, or Firm*—Stewart A. Fraser

(57) ABSTRACT

A current collector and seal assembly for use in an electrochemical cell is provided. An electrochemical cell comprises a container generally having a closed bottom end, an open top end, and side walls extending between the top and bottom ends. Electrochemically active materials are disposed in the container, and generally include a positive electrode and a negative electrode. A current collector and seal assembly is provided to close the open end of the container and includes a resilient and electrically non-conductive seal body having an upstanding wall defining an opening therethrough. A current collector is inserted through the opening and into one of the electrochemically active components. A polymeric compression bushing compresses the upstanding wall so that the collector and compression bushing cooperate to exert radial compressive stress and tangential compressive stress on the upstanding wall after insertion of the current collector through the opening.

27 Claims, 2 Drawing Sheets

CURRENT COLLECTOR AND SEAL ASSEMBLY FOR ELECTROCHEMICAL CELL

BACKGROUND OF THE INVENTION

The present invention generally relates to electrochemical cells and, more particularly, to a current collector and seal assembly for an electrochemical cell.

Alkaline electrochemical cells typically include a cylindrical steel can having a closed end, an open end, and side walls extending therebetween. The can contains electrochemically active materials which include a positive electrode, commonly referred to as the cathode, comprising manganese dioxide as the active material, and a negative electrode, commonly referred to as the anode, comprising zinc powder. Conventional cells often employ a bobbin-type construction in which the anode is centrally located and is surrounded by a tubularly shaped cathode which contacts the can walls. A separator is generally located between the anode and cathode, and an alkaline electrolyte solution simultaneously contacts, the cathode, the anode, and the separator.

Conventional electrochemical cells have a conductive current collector, which is typically in the shape of an elongated brass nail, inserted into the anode active material, and a seal assembly which provides closure to the open end of the steel can. The current collector generally extends through an opening, i.e., aperture, provided in the seal and provides an electrical connection between the anode and an outer conductive cover which serves as the negative terminal. The current collector, seal, and an inner metal cover are usually preassembled together to form what is commonly referred to as a current collector and seal assembly. The seal has a centrally located opening through which the current collector protrudes, and a sealant is typically disposed between the current collector and seal. The outer perimeter of the seal and the central portion of the seal which surrounds the centrally located opening are usually reinforced by a thickening of the seal's material. Between the outer perimeter and central portion, is a diaphragm which often has a thinned section for providing a stress concentration pressure release vent for allowing the seal to rupture when the cell's internal pressure exceeds a predetermined limit, to thereby vent high pressure gases from within the cell.

The reinforced central portion of the seal that surrounds and defines the centrally located opening is commonly referred to as the "hub." The current collector is inserted through the opening in the hub so that an interference fit exists between the seal hub and the collector. In some commercially available cells, the diameter of the collector nail is usually greater than the inside diameter of the opening to create an interference fit so that electrolyte cannot escape from the cell along the surface of the collector. Often, the interference fit results in the creation of tangential tension which, if excessive, may exceed the seal hub's material strength and cause the seal to split and allow electrolyte solution to escape. On the other hand, if the interference fit is insufficient, electrolyte solution may escape between the collector and the seal.

A number of current collector and seal assemblies are known for maintaining a sealed closure between the seal and current collector. One approach uses a plastic coated metallic sleeve located on the interior surface of the seal for compressing the plastic against the collector to prevent leakage of electrolyte. Yet, another approach discloses the use of an inner metal cover, in which the collector is inserted through the seal's central opening so that the upstanding wall of the seal hub which surrounds the collector is forced outward against the inner metal cover. However, the current collector exerts tangential tension against the seal's upstanding wall forming the hub. Additionally, one commercially available battery has employed a flat metallic ring around the seal body so that the seal is compressed between the collector and ring as the collector is forced through the seal's central opening. Many of the above assemblies result in the creation of tangential tension in the seal which, when exposed to potassium hydroxide, may result in stress corrosion cracking which may allow for electrolyte leakage. In an attempt to minimize the likelihood of stress corrosion cracking, prior approaches often require coating the seal with a protectant such as asphalt.

A more recent approach is disclosed in U.S. Pat. No. 5,422,201, entitled "CURRENT COLLECTOR ASSEMBLY FOR AN ELECTROCHEMICAL CELL," which is incorporated herein by reference. The aforementioned patent discloses the use of a compression means in the form of a tubularly shaped metallic component having one end flared radially outward. The metallic component is inserted around the upstanding wall forming the hub of the seal to compress a central opening formed in the hub. With the tubular metallic component in place, the current collector nail is driven upward through the compressed opening from the bottom side. In doing so, the compressed opening is forcibly increased in diameter by an amount that prevents the creation of tangential tension in the seal's hub, yet allows for compression of the hub against the current collector. The flared end of the tubular shaped metallic component creates a shear edge against the seal's vent; however, the metallic component is orientation sensitive and, therefore, may be difficult to handle and assemble with modern cell manufacturing equipment.

While known current collector assemblies have been used for many years, there exists a need for an improved current collector and seal assembly that is easy to assemble, imparts little or no tangential tension on the seal's hub to avoid hub splitting, and provides sufficient radial compressive stress and tangential compressive stress on the seal's hub.

SUMMARY OF THE INVENTION

The present invention improves the reliability and process assembly of the collector and seal assembly for use in an electrochemical cell. To achieve this and other advantages, and in accordance with the purpose of the invention as embodied and described herein, a collector and seal assembly and an electrochemical cell including the collector and seal assembly are provided according to the present invention. The collector and seal assembly includes a resilient and electrically non-conductive seal body having an upstanding wall defining an opening therethrough. A current collector is inserted through the opening and is adapted to contact electrochemically active material in a cell. A polymeric compression bushing contacts and compresses the upstanding wall of the seal. Accordingly, the collector and compression bushing preferably cooperate to exert radial compressive stress and tangential compressive stress on the upstanding wall of the seal after insertion of the current collector through the opening.

The collector and seal assembly of the present invention is assembled for use in an electrochemical cell. The electrochemical cell has a container generally including a closed bottom end, an open top end, and side walls extending between the top and bottom ends. Electrochemically active materials are disposed in the container, and generally include a positive electrode and a negative electrode. The collector and seal assembly is disposed in the open end of the container to seal closed the open end. The collector and seal assembly is easy to assemble and minimizes tension in the seal to prevent stress corrosion cracking of the seal.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
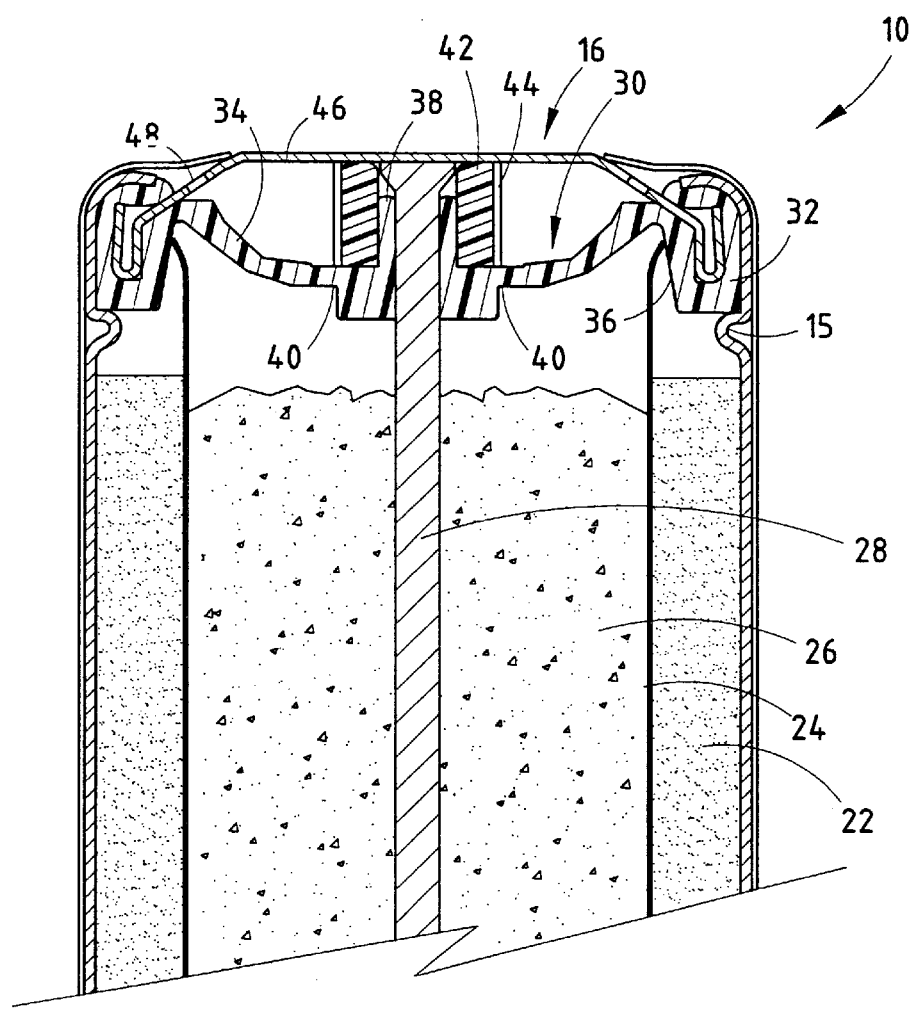
FIG. 1 is a longitudinal cross-sectional view of an electrochemical cell having a collector and seal assembly containing a compression bushing according to the present invention.
Figure 1:
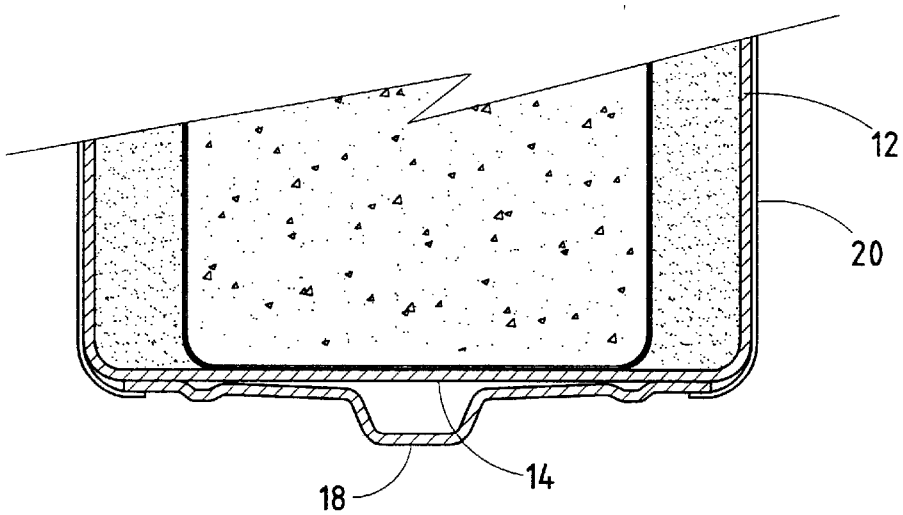

Referring to FIG. 1, a cylindrical electrochemical cell 10, such as an alkaline cell according to one example, is shown therein. Electrochemical cell 10 includes a cylindrical steel can 12 having a closed bottom end 14 and an open top end 16. The closed bottom end 14 of can 12 includes a positive cover 18 welded or otherwise attached thereto and formed of plated steel, with a protruding nub at its center region, which forms the positive contact terminal of cell 10. A metalized, plastic film label 20 is formed about the exterior surface of steel can 12, except for the ends of steel can 12. Film label 20 may be formed over the peripheral edge of the positive cover and may extend partially onto the negative cover as shown.

A cathode 22 is formed about the interior surface of steel can 12, and is generally tubular shaped. According to one example, the cathode 22 is formed of a mixture of manganese dioxide, graphite, potassium hydroxide (KOH) solution, and additives. A separator 24, which may include a cup-shaped separator and is preferably formed of a nonwoven fabric that prevents migration of any solid particles in the cell 10, is disposed about the interior surface of cathode 22. An anode 26 is disposed with alkaline electrolyte inside the separator 24, generally in the center of the cell 10. According to one example, the anode 26 is formed of zinc powder, a gelling agent, and additives. Disposed in contact with anode 26 is a current collector 28, which may include a brass nail having an elongated body and an enlarged head at one end. Accordingly, the cathode 22 is configured as the cell's positive electrode, and the anode 26 is configured as the cell's negative electrode. The anode 26, cathode 22, and separator 24 may alternately be configured in a spiral wound configuration for a jelly-roll cell construction, or may be otherwise configured in primary or secondary cells, without departing from the teachings of the present invention.

The electrochemical cell 10 includes a collector and seal assembly which closes the open end 16 of steel can 12.

Included in the collector and seal assembly is current collector 28, an annular nylon seal 30, and a polymeric compression bushing 42. The current collector 28, nylon seal 30, and polymeric compression bushing 42 are preferably pre-assembled and inserted into the open end 16 of steel can 12 as an assembled unit. In addition, an outer conductive cover 46, which forms the negative contact terminal of cell 10, is disposed over the collector and seal assembly. The outer negative cover 46 is preferably formed of plated steel, and is in contact with current collector 28, preferably via pressure contact or a weld. The outer negative cover 46 includes one or more vent openings 48 that serve to expose the non-sealed volume of cell 10 to the surrounding outside atmosphere to allow for venting of gases during a cell venting condition.

The annular nylon seal 30 has an outer peripheral upstanding wall 32 formed at its outer perimeter, and an inner upstanding wall which forms a thickened hub 38 at the center of seal 30. Formed between central hub 38 and outer upstanding wall 32 is an inwardly curved, i.e., concave, diaphragm 34 and an inverted V-section 36. The inverted V-section provides a raised channel between the diaphragm 34 and outer upstanding wall 32 for receiving the top open end of separator 24. Accordingly, the separator 24 fits into the inverted V-section and conforms thereto.

The concave diaphragm 34 is curved or bent inward towards the sealed inner volume of the can 12 so as to cause compressive force to be applied to the seal 30 when the pressure in the sealed volume of cell 10 is greater than the atmospheric pressure in the non-sealed volume. The concave diaphragm 34 may be in the shape of an elbow, or other configuration. When the seal 30 is disposed in can 12, the sealed volume becomes slightly pressurized and, as the cell discharges, the pressure generally increases. Since the sealed volume of cell 10 generally always has a pressure greater than the atmospheric pressure, the seal 30 is generally always under compression. By maintaining the seal 30 in a compressed state, the seal 30 is less susceptible to damage when exposed to KOH. Since the adverse effects caused by KOH are reduced by maintaining the seal 30 under compression, little or no protective asphalt coating may be required.

The seal's central hub 38 has a cylindrical opening defined vertically therethrough for receiving the current collector 28 and providing an interference fit sealed closure between collector nail 28 and hub 38. Formed about the outer perimeter of hub 38 is an outer cylindrical upstanding wall. The polymeric compression grommet 42 is force fitted around the outer upstanding wall of hub 38 so as to compress hub 38, radially inward. Compression grommet 42 completely surrounds the outer upstanding wall of hub 38 and further extends above hub 38 and contacts the bottom surface of outer cover 46 to provide a support structure that enhances the vent shear edge and supports the collector and seal orientation.

Seal 30 further has a thinned-section 40 formed in the diaphragm 38 adjacent to the bottom outer peripheral edge of compression bushing 42. Thinned-section 40 serves to provide a force concentration vent for venting pressure when the internal pressure in the sealed volume of the cell reaches a predetermined pressure limit. By placing the thinned-section 40 at a location adjacent to the bottom outer edge of polymeric compression bushing 42, the bottom outer edge of compression bushing 42 serves to provide a shear edge to achieve a more consistent venting action. In addition, the polymeric compression bushing 42 has vertical grooves 44 formed therein for preventing sealing of the flexed seal diaphragm 34 against the upstanding walls of compression bushing 42 during a cell venting condition.

Figure 2:
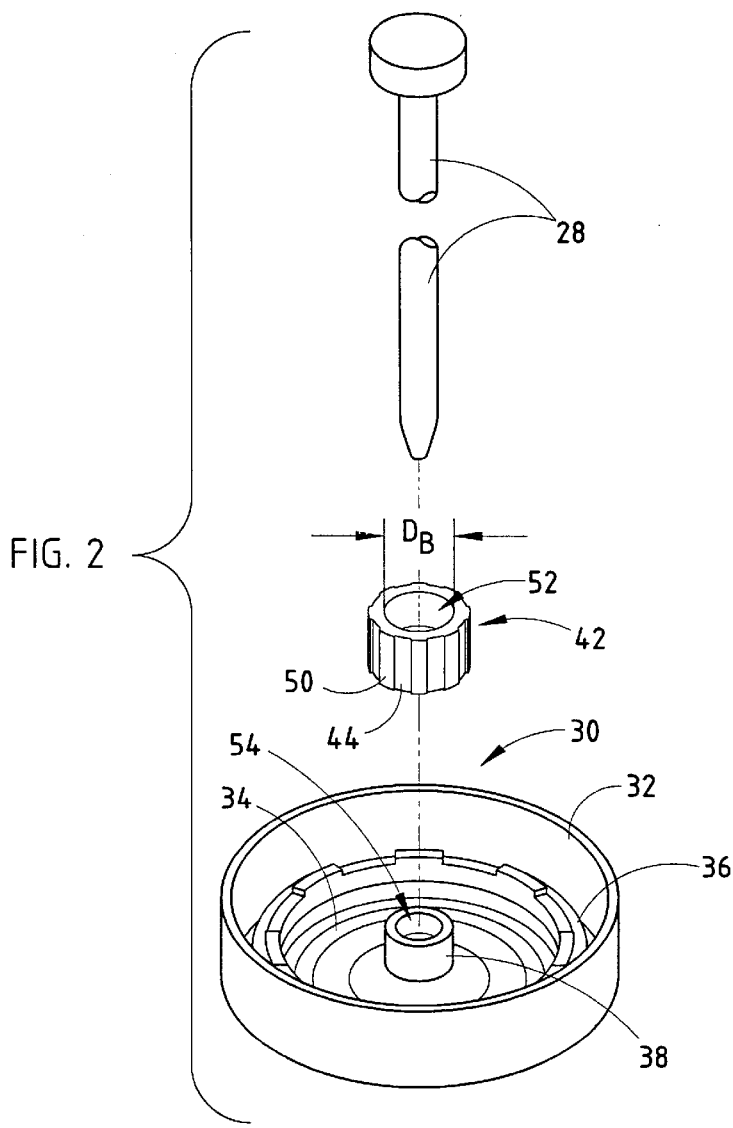
FIG. 2 is an elevated exploded view of the collector and seal assembly of FIG. 1.

The assembly of the collector 28, seal 30, and compression bushing 42 to form the collector and seal assembly is illustrated in FIGS. 2–5. With particular reference to FIG. 2, the polymeric compression bushing 42 has a cylindrical opening 52 formed centrally therethrough with a diameter $D_B$. The compression bushing 42 is made up of polymeric material, and more particularly, is made of polystyrene which is rigid and non-stretchable. Polymeric compression bushing 42 is therefore rigid and non-stretchable. Compression bushing 42 is formed in a generally cylindrical shape such that it is symmetric both with respect to the central longitudinal axis of the cell passing through opening 52 and an axis oriented perpendicular to the longitudinal axis. Compression bushing 42 has an outer peripheral wall 50 with a plurality of vertical channels 44 formed in its outer upstanding wall. Channels 44 are circumferentially spaced around the perimeter of the outer surface of compression bushing 42, and have a preferred depth of approximately 5–7 mils. The compression bushing 42 is preferably an injected molded part that is orientation insensitive, since the top end is symmetric with the bottom end. Accordingly, compression bushing 42 can be inserted onto hub 38 from either its top or bottom end. This simplifies the cell assembly process, since some manufacturing equipment can easily handle and orient the compression bushing 42 into an upright position for insertion onto hub 38. During manufacture, the polymeric compression bushing 42 is forcefully inserted onto hub 38, and thereafter the current collector 28 is inserted downwardly from the top end into the central opening 54 formed in hub 38 of seal 30.

Figure 3:
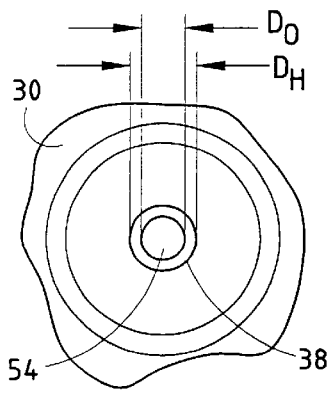
FIG. 3 is a sectional top view of the seal prior to assembly.

With particular reference to FIG. 3, the nylon seal 30 is shown prior to assembly of the collector and seal assembly. The central opening 54 formed in the seal's hub 38 has an initial non-compressed inside diameter $D_O$. The outer upstanding walls of hub 38 define an initial noncompressed diameter $D_H$. The outer wall diameter $D_H$ of hub 38 is larger than the inside diameter $D_B$ of the central opening 52 formed in compression bushing 42. In addition, the upstanding wall of hub 38 may have a slight taper with a smaller diameter at the top end to allow compression bushing 42 to more easily engage hub 38.

Figure 4:
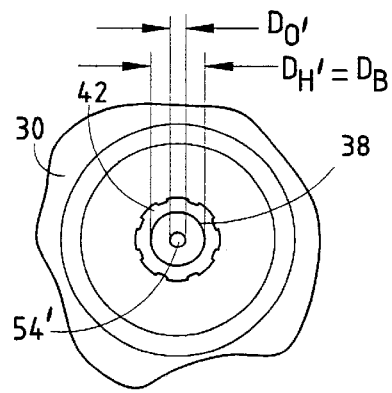
FIG. 4 is a sectional top view of the seal partially assembled with the compression bushing.

As the compression bushing 42 is forcefully inserted onto the outer upstanding wall of hub 38, the upstanding wall of hub 38 is compressed radially inward as is shown in FIG. 4. When the polymeric compression bushing 42 is forcibly inserted onto the upstanding walls of hub 38, the central opening 54' is reduced to a reduced diameter $D_O'$ due to the radial compression caused by compression bushing 42 on hub 38. Also, the outer wall diameter $D_H$ of hub 38 is also reduced to a diameter of $D_H'$.

Figure 5:
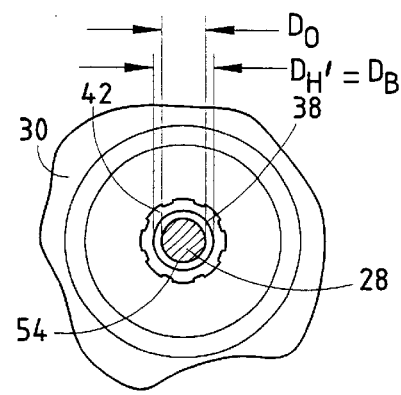
FIG. 5 is a sectional top view of the seal further illustrating assembly of the collector inserted through the central opening in the seal hub.

Once the compression bushing 42 has been force fitted onto hub 38 so as to reduce the size of opening 54', the current collector nail 28 is then inserted into opening 54 as shown in FIG. 5. With the collector nail 28 fully inserted, the size of opening 54' is forced to expand to substantially its original size 54. In doing so, compression bushing 42 provides a compressive force on hub 38, so as to keep the hub 38 in a compressive state, instead of allowing the hub 38 to be in tension.

Accordingly, the seal hub 38 is compressed between polymeric compression bushing 42 and collector 28 so as to exert radial compressive stress and tangential compressive stress on the seal's hub 38. It has been discovered that by maintaining the hub 38 in compression, rather than under tension, the hub 38 is less prone to stress corrosion cracking, which is particularly significant when the seal 30 is exposed to KOH. As a consequence, the amount of sealant employed between the collector and seal, and the amount of asphalt employed on the bottom of the seal can be reduced or even eliminated. It should also be appreciated that the collector and seal assembly does not employ an inner metal cover.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A current collector and seal assembly for sealing electrochemically active components within a container, said assembly comprising:

a resilient and electrically non-conductive seal body having a hub with an inner upstanding wall defining an opening therethrough;

a current collector inserted through said opening and adapted to contact electrochemically active components in an electrochemical cell; and a polymeric compression bushing contacting an outer periphery of said inner upstanding wall of said hub and compressing said upstanding wall of said hub against said current collector.

2. The assembly as defined in claim 1, wherein said polymeric compression bushing comprises polystyrene.

3. The assembly as defined in claim 2, wherein said polymeric compression bushing is injection molded.

4. The assembly as defined in claim 1, wherein said current collector and said compression bushing cooperate to exert radial compressive stress and tangential compressive stress on the inner upstanding wall of said hub of the seal after said current collector is inserted through said opening.

5. The assembly as defined in claim 1, wherein said compression bushing comprises an upstanding wall having at least one vertical passage to prevent sealing of said seal against the wall of said compression bushing during a vent condition.

6. The assembly as defined in claim 5, wherein said at least one vertical passage comprises a plurality of grooves found in said upstanding wall of said compression bushing.

7. The assembly as defined in claim 1, wherein said seal further comprises an outer upstanding wall formed at the perimeter of said seal and a diaphragm interconnected between the inner upstanding wall and outer upstanding wall.

8. The assembly as defined in claim 7 further comprising a stress concentration section formed in said diaphragm in a region adjacent to an outer perimeter of said bushing.

9. The assembly as defined in claim 7, wherein said diaphragm has a concave bottom surface which causes said diaphragm to be compressed when an elevated pressure exists in the container.

10. The assembly as defined in claim 9, wherein the concave bottom surface of said diaphragm has an elbow shape.

11. The assembly as defined in claim 7, wherein said seal has an inverted V-shape section located between said diaphragm and said outer upstanding wall for receiving an end of a separator.

12. The assembly as defined in claim 1, wherein said compression bushing has an aperture extending along a longitudinal axis for receiving said hub, wherein said compression bushing is substantially symmetric about an axis perpendicular to said longitudinal axis.

13. The assembly as defined in claim 12, wherein said compression bushing comprises a substantially ring-shaped bushing.

14. The assembly as defined in claim 1, wherein said seal is not radially supported by a radial support member.

15. An electrochemical cell comprising:
   a container having a closed bottom end, an open top end, and upstanding walls extending between the bottom and top ends;
   electrochemically active materials disposed in said container, said electrochemically active materials including a positive electrode and a negative electrode;
   a resilient and electrically non-conductive seal body having a hub with an inner upstanding wall protruding from a surface and defining an opening through said seal body;
   an electrically conductive collector extending through said opening in said seal body to provide electrical continuity between said electrochemically active materials within said cell and the exterior of said cell; and
   a polymeric compression bushing contacting an outer periphery of the inner upstanding wall and compressing said upstanding wall of the hub against the current collector.

16. The electrochemical cell as defined in claim 15, wherein said compression bushing and said collector cooperatively exert radial compressive stress and tangential compressive stress on the inner upstanding wall.

17. The electrochemical cell as defined in claim 15 further comprising a terminal cover in contact with said current collector.

18. The electrochemical cell as defined in claim 15, wherein said polymeric compression bushing comprises polystyrene.

19. The electrochemical cell as defined in claim 15, wherein said compression bushing is an injection molded bushing.

20. The electrochemical cell as defined in claim 15, wherein said compression bushing comprises an upstanding wall having at least one vertical passage to prevent sealing of said seal against the upstanding wall of said compression bushing during a vent condition.

21. The electrochemical cell as defined in claim 20, wherein said at least one vertical passage comprises a plurality of grooves found in said upstanding wall of said compression bushing.

22. The electrochemical cell as defined in claim 15, wherein said seal further comprises an outer upstanding wall formed at the perimeter of said seal and a diaphragm interconnected between the inner upstanding wall and outer upstanding wall.

23. The electrochemical cell as defined in claim 22, wherein said diaphragm has a concave bottom surface which causes said diaphragm to be compressed when an elevated pressure exists in the container.

24. The electrochemical cell as defined in claim 15, wherein said seal has an inverted V-shape section located between said diaphragm and said outer upstanding wall for receiving an end of a separator.

25. The electrochemical cell as defined in claim 15 further comprising an alkaline electrolyte including potassium hydroxide.

26. The electrochemical cell as defined in claim 15, wherein said compression bushing has an aperture extending through a longitudinal axis for receiving said hub, and said compression bushing is substantially symmetric about an axis perpendicular to said longitudinal axis.

27. The electrochemical cell as defined in claim 26, wherein said compression bushing is substantially ring-shaped.

* * * * *